_(cover page — bibliographic data only)_

PROCESS OF EXTRUDING SNYTHETIC THERMOPLASTIC RESINS USING ORGANOSILICON RESINOUS COMPOSITIONS AS EXTRUSION LUBRICANTS

BACKGROUND OF THE INVENTION

This invention is directed to an organosilicon resinous composition which has been found to have particular utility as a replacement for fluoroelastomers currently being used as lubricants in the extrusion of thermoplastic resins.

When a high molecular weight thermoplastic resin is extruded through a die, it is known that smooth extrudates can only be obtained up to certain shear stresses. Beyond that, surface irregularities begin to appear such as haze and what is known in the art as "sharkskin". These irregularities limit the production rates in commercial applications.

To counteract this undesirable phenomenon, and to enable production at higher rates, lubricants are added to the thermoplastic resin prior to extrusion. One of the primary functions of a lubricant is to delay, suppress, or eliminate, the onset of surface flow defects such as haze and "sharkskin, and to enable operation at higher shear stress.

Fluoroelastomers are currently being used in industry as lubricants for extruding thermoplastic resins. The addition of 250 to 3,000 parts per million of the fluoroelastomer lubricant, delays the onset of melt fracture to higher shear rates and produces smoother extrudates. Typically, these lubricants are added to the thermoplastic resin prior to extrusion by dry blending the lubricant with the resin.

It has been discovered in accordance with the present invention, however, that certain organosilicon compounds, namely organosilicon resinous compositions, are capable of functioning as lubricants for the extrusion of thermoplastic resins, and are as effective, if not more effective, than current commercial fluoroelastomeric lubricants being used in the industry.

These organosilicon resinous compositions provide a viable alternative to the current commercial fluorelastomeric products, and are useful in alleviating what has heretofore been considered difficult extrusion operations.

SUMMARY OF THE INVENTION

The invention relates to a method of extruding a thermoplastic resin in which a lubricant is added to the resin prior to extrusion. The improvement resides in the use of certain organosilicon resinous compositions as a lubricant for the resin.

The invention also relates to a composition including a mixture of a thermoplastic resin and an organosilicon resinous composition as a lubricant fop the resin.

Any thermoplastic synthetic resin may be used in accordance with the present invention including styrenics, acrylics, cellulosics, polyolefins, halogenated polyolefins, polysulphones, polyimides, polyvinyl alcohols, ethylene-vinyl acetate copolymers, polyester, polycarbonates, ABS resins, vinyls, nylons, and fluorocarbons. The resin may be a homopolymer, copolymer, or blended mixtures thereof. The preferred resin is polyethylene including low density polyethylene (LDPE), high density polyethylene (HDPE), high pressure-low density polyethylene (HPLDPE), low pressure-low density polyethylene (LPLDPE), and linear low density polyethylene (LLDPE). The most preferred polyethylene is linear low density polyethylene (LLDPE). The resin can be in the form of a powder, pellet, granule, or any other form convenient for extrusion.

The invention further relates to the use of an organosilicon resinous composition as an effective lubricant for thermoplastic resins, for the purpose of improving performance at high rates of production, and the use of the composition as a viable replacement for current commercial fluoroelastomeric lubricant compositions.

The invention is applicable to the extrusion of thermoplastic resins including extrusion of cast or blown films; extrusion blow molding; injection molding; pipe, wire, or cable extrusion; and fiber production; or any similar melt processing of thermoplastic resins.

The organosilicon resinous lubricant composition can be added to the thermoplastic resin by blending the two components in a Banbury mixer, a mixing extruder, or simply by dry blending the two components.

Other conventional processing aids can be added to the mixture if desired, such as those processing aids which function to provide viscosity control, assist mold release of finished parts, prevent slip, prevent blocking and adhesion, or improve the formulation of a filled or reinforced compound.

These and other features, objects, and advantages, of the present invention will become more apparent from a consideration of the following detailed description thereof.

DETAILED DESCRIPTION OF THE INVENTION

The lubricant of the present invention is an organosilicon resinous composition, and more particularly can be one or more of several categories and types of resinous composition.

The organosilicon resinous composition can be broadly described as an organosilicon resinous copolymer which includes $R_3SiO_{\frac{1}{2}}$ units, $R_2SiO_{2/2}$ units, $RSiO_{3/2}$ units, and $SiO_{4/2}$ units, in a molar ratio such that the number average molecular weight of the resinous copolymer is between 1,200 to 10,000. R represents one or more of the hydrocarbon groups such as alkyl radicals of one to six carbon atoms including methyl through hexyl; aryl radicals including phenyl, tolyl, and xylyl; alkenyl radicals including vinyl and allyl; and trifluoropropyl radicals.

The organosilicon resinous composition can be employed alone or in combination with a linear or branched siloxane polymer of the formula $R_3SiO(R_2SiO)_nSiR_3$ in which R represents one or more of the hydrocarbon groups such as alkyl radicals of one to six carbon atoms including methyl through hexyl; aryl radicals including phenyl, tolyl, and xylyl; alkenyl radicals including vinyl and allyl; and trifluoropropyl radicals. The integer represented by n can have a value of between one and one hundred thousand, and the linear siloxane polymer fluid can have a viscosity up to about 2,500,000 Centistokes. For example, a value of about 500 for n will typically provide a fluid having a viscosity of about 10,000 Centistokes. This material should have a molecular weight sufficient to be non-volatile by stripping.

The organosilicon resinous composition can be employed alone or in combination with an absorbing filler. Suitable absorbing fillers which can be employed are fumed silica, precipitated silica, calcium carbonate, talc, mica, and clay.

The organosilicon resinous composition (i) can be employed alone, (ii) can be employed in combination with a linear or branched siloxane polymer of the formula $R_3SiO(R_2SiO)_nSiR_3$, (iii) can be employed in combination with an absorbing filler, and (iv) can be employed in combination with the linear or branched siloxane polymer and the absorbing filler.

Specific organosilicon resinous compositions most preferred in accordance with the present invention are set forth below.

A "first" organosilicon resinous composition which can be used as a lubricant according to the present invention, is a benzene soluble resin copolymer of triorganosiloxy units $R_3SiO_{\frac{1}{2}}$ and $SiO_{4/2}$ units which are in the mole ratio of about 0.7 moles of triorganosiloxy units per mole of $SiO_{4/2}$ units. This resin has a number average molecular weight of about 5,000 based on gel permeation chromatography using silicate resin standards. In this resin copolymer, the triorganosiloxy units are trimethylsiloxy units and dimethylvinylsiloxy units, and the resin copolymer includes from 1.4 to 2.2 weight percent of silicon bonded vinyl radicals. If desired, this resinous composition may be delivered in a silicone fluid having a molecular weight sufficient to be non-volatile by stripping, such that no volatile materials are apparent at the processing temperatures employed in the extrusion process. One example of a suitable silicone fluid is a polydimethylsiloxane fluid having a viscosity of about 60,000 Centistokes measured at twenty-five degrees Centigrade. Any polydimethylsiloxane based silicone fluid may be used, however. In the most preferred embodiment of the invention, the silicone fluid is a dimethylvinylsiloxy endblocked polydimethylsiloxane.

A "second" organosilicon resinous composition which can be used as a lubricant according to the present invention, is a benzene soluble resin copolymer of triorganosiloxy units and $SiO_{4/2}$ units which are in the mole ratio of about 0.7 moles of triorganoslloxy units per mole of $SiO_{4/2}$ units with a number average molecular weight of about 5,000. In this resin copolymer, the triorganosiloxy units are trimethylsiloxy units and dimethylvinylsiloxy units, and the resin copolymer includes from 1.8 to 2.25 weight percent vinyl radicals. If desired, this resinous composition may be delivered in a silicone fluid having a molecular weight sufficient to be non-volatile by stripping, such that no volatile materials are apparent at the processing temperatures employed in the extrusion process. One example of a suitable silicone fluid is a polydimethylsiloxane fluid having a viscosity of about 60,000 Centistokes measured at twenty-five degrees Centigrade. Any polydimethylsiloxane based silicone fluid may be used, however. In the most preferred embodiment of the invention, the silicone fluid is a dimethylvinylsiloxy endblocked polydimethylsiloxane.

A "third" organosilicon resinous composition which can be used as a lubricant according to the present invention, is a resinous copolymertc siloxane composition which is prepared by (i) forming an acidic homogenous mixture of a silanol containing resinous copolymeric siloxane with $R_3SiO_{\frac{1}{2}}$ siloxane units and $SiO_{4/2}$ units; an organohydrogenpolysiloxane having the formula $R_mH_nSiO_{(4-m-n)/2}$ in which m and n are positive integers having a sum less than four and preferable from 1.9 to 2.1; and an organic solvent, and (ii) heating the mixture to remove substantially all of the organic solvent. The R units denote monovalent hydrocarbon radicals such as an alkyl radical including methyl through hexyl; an alkenyl radical including vinyl and allyl; an aryl radical including phenyl, tolyl, and xylyl; an arylalkyl radical including betaphenylethyl and betaphenylpropyl; and a cycloaliphatic radical including cyclopentyl, cyclohexyl, and cyclohexenyl. If desired, this resinous composition may be delivered in a silicone fluid having a molecular weight sufficient to be non-volatile by stripping, such that no volatile materials are apparent at the processing temperatures employed in the extrusion process. One example of a suitable silicone fluid is a polydimethylsiloxane fluid having a viscosity of about 60,000 Centistokes measured at twenty-five degrees Centigrade. Any polydimethylsiloxane based silicone fluid may be used, however. In the most preferred embodiment of the invention, the silicone fluid is a dimethylvinylsiloxy endblocked polydimethylsiloxane. Such resinous compositions and methods for their preparation are described in U.S. Pat. No. 4,322,518.

A "fourth" organosilicon resinous composition which can be used as a lubricant according to the present invention, is a siloxane resin copolymer including $R_3SiO_{\frac{1}{2}}$ units and $SiO_{4/2}$ units in a mole ratio such that the number average molecular weight is between 1,200 to 10,000. Preferably, the mole ratio approximately 0.7:1.0, and the number average molecular weight is about 5,000. R can be one or more of alkyl radicals of one to six carbon atoms, and aryl radicals. The siloxane resin copolymer can additionally contain $R_2SiO_{2/2}$ units and $RSiO_{3/2}$ units if desired. This OH containing resinous composition can be shown as $(HOSiO_{3/2})$ and preferably contains about 2.5 weight percent of silanol based on OH, If desired, this resinous composition may be delivered in a silicone fluid having a molecular weight sufficient to be non-volatile by stripping, such that no volatile materials are apparent at the processing temperatures employed in the extrusion process. One example of a suitable silicone fluid is a polydimethylsiloxane fluid having a viscosity of about 60,000 Centistokes measured at twenty-five degrees Centigrade. Any polydimethylsiloxane based silicone fluid may be used, however. In the most preferred embodiment of the invention, the silicone fluid is a dimethylvinylsiloxy endblocked polydimethylsiloxane. Such resinous compositions and methods for their preparation are described in U.S. Pat. Nos. 2,676,182 and 6,310,678.

A "fifth" organosilicon resinous composition which can be used as a lubricant according to the present invention, is a siloxane resin copolymer similar to the "fourth" resin described above, except that the "fifth" organosilicon resinous composition has a different mole ratio of $R_3SiO_{178}$ units and $SiO_{4/2}$ units. In the "fifth" resin, the mole ratio is approximately 0.75:1.0. In addition, the "fifth" organosilicon resinous composition differs from the "fourth" resin in its silanol content. In the "fifth" resin, the silanol content is preferably less than about 1.0 weight percent of silanol based on OH.

A "sixth" organosilicon resinous composition which can be used as a lubricant according to the present invention, is a resinous copolymeric siloxane composition which is the same as the "third" resin described above but which additionally contains one of the absorbing fillers noted previously.

The following examples are set forth in order to illustrate the concept of the present invention in mope detail.

EXAMPLE I

In independently conducted extrusion trials using the lubricants of the present invention, linear low density polyethylene resin (LLDPE) was tumble blended with the lubricant at concentrations ranging from 200 to 800 parts per million. Extrusion was performed on a laboratory scale single screw KILLON extruder. Samples of the extrudate were collected and inspected microscopically fop the presence of surface defects.

The extrusion trials included comparative testing of the organosilicon resinous lubricants against other commercial grades of lubricants including fluoroelastomers. It was reported that the organosilicon resinous lubricants of the present invention suppressed "sharkskin" in a fashion comparable to the commercial grades. Since the lubricants of the present invention were used at a concentration of 200-300 ppm., and the commercial grades of lubricants which were used at a concentration of 400-600 ppm., the performance of the instant organosilicon resinous lubricants was considered mope effective.

The detailed data from the extrusion trials is proprietary to the independent testing facility, and only the conclusions from the testing have been set forth herein.

In order to further illustrate the concept of the present invention, in-house extrusion trials were conducted, and the details of the trials and the results are set forth below in Example II and in Table II.

EXAMPLE II

In-house extrusion trials were conducted on a Haake System 90 Rheometer equipped with a TW 100 twin screw extruder. The extruder had intermeshing counter-rotating high intensity mix screws with a length of thirteen inches. The screws had a front diameter of 0.775 inches and a rear diameter of 1.225 inches. The System 90 Rheometer was equipped with a torque measuring device. A linear low density polyethylene (LLDPE) was employed in admixture with the organosilicon resinous lubricant compositions of the invention. The equipment was operated at the temperature settings shown in Table I.

TABLE I

| Extruder Parameter | Zone Temperature (Centigrade) |
| --- | --- |
| Feed Zone 1 | 125 |
| Mixing Zone 2 | 185 |
| Mixing Zone 3 | 185 |
| Exit Die Zone 4 | 185 |

There was no feed metering during the extrusion trials, and the extruder was operated at a speeds of fifty RPM and one hundred RPM. The temperature in Feed Zone 1 was lowered in order to minimize or eliminate pellet sticking and melting of the resinous silicone. During the second pass, the temperature used in Mixing Zone 1 was 170 degrees Centigrade. The throat of the hopper zone was cooled with running cold water during these in-house extrusion trials. The test results are set forth in Table II.

TABLE II

| Material Extruded | Torque (mg) Pass 1 | Torque (mg) Pass 2 | Screw RPM |
| --- | --- | --- | --- |
| 100% LLDPE | 7123 | — | 50 |
| 100% LLDPE | 8632 | — | 100 |
| 95% LLDPE 5% "First" Silicone | 1553 | 1291 | 100 |
| 95% LLDPE 2.5% "Second" Silicone 2.5% Silicone Fluid 60,000 centistokes | 2087 | 1585 | 100 |
| 95% LLDPE 5% "Third" Silicone | 1167 | 930 | 100 |
| 95% LLDPE 5% "Fourth" Silicone | 5079 | — | 50 |
| 95% LLDPE 5% "Fourth" Silicone | — | 4340 | 100 |
| 95% LLDPE 5% "Fifth" Silicone | 8366 | — | 50 |
| 95% LLDPE 5% "Fifth" Silicone | — | 5551 | 100 |
| 95% LLDPE 5% "Sixth" Silicone With Silica | 1418 | — | 50 |
| 95% LLDPE 5% "Sixth" Silicone With Silica | — | 3176 | 100 |

As noted in Table II, in one extrusion trial silica was employed in admixture with the "Sixth" silicone resin. The silica used was CAB-O-Sil® MS 75, a trademark and a product of the Cabot Corporation, CAB-O-Sil® Division, Tuscola, Ill. U.S.A. The purpose of the silica in that embodiment was to minimize any screw slippage. In that embodiment, 160 grams of the resin was mixed with 50 grams of silica. The "Second" silicone resin was utilized in one embodiment during the extrusion trial in admixture with a 60,000 centistoke polydimethylsiloxane fluid, as noted in Table II. In the table, the effectiveness of any particular resin as a lubricant is reflected by a low value of the Torque measurement, in comparison to the two "controls" which were 100% LLDPE at fifty RPM and 100% LLDPE at one hundred RPM.

The thermoplastic resin may contain from 100 to 3,000 parts per million of the organosilicon resinous composition.

Other variations and modifications may be made in the compounds, compositions, and methods, described herein without departing from the essential features and concepts of the present invention. The forms of the invention described herein are exemplary only and are not intended as limitations on the scope of the invention as defined in the appended claims.

That which is claimed is:

1. In a method of extruding a synthetic thermoplastic resin in which a processing aid in the form of a lubricant is added to the thermoplastic resin in order to facilitate processing of the thermoplastic resin, and the resin is extruded, the improvement comprising utilizing as the lubricant for the thermoplastic resin, from 100 to 3,000 parts per million of an organosilicon resinous composition selected from the group consisting of:
   (i) an organosilicon resinous copolymer which includes in the molecule $R_3SiO_{178}$ units, $R_2SiO_{2/2}$ units, $RSiO_{3/2}$ units, and $SiO_{4/2}$ units, in a molar ratio such that the number average molecular weight of the resinous copolymer is between 1,200 to 10,000, and in which R represents a radical selected from the group consisting of alkyl radicals of one to six carbon atoms; aryl radicals; alkenyl radicals; trifluoropropyl radicals; and mixtures thereof;
   (ii) a mixture of an organosilicon resinous copolymer which includes in the molecule $R_3SiO_{178}$ units, $R_2SiO_{2/2}$ units, $RSiO_{3/2}$ units, and $SiO_{4/2}$ units, in a molar ratio such that the number average molecular weight of the resinous copolymer is between 1,200 to 10,000, in which R represents a radical selected from the group consisting of alkyl radicals of one to six carbon atoms; aryl radicals; alkenyl radicals; trifluoropropyl radicals; and mixtures thereof; and a siloxane polymer of the formula $R_3SiO(R_2SiO)_nSiR_3$ in which R represents a radical selected from the group consisting of alkyl radicals of one to six carbon atoms; aryl radicals; alkenyl radicals; and trifluoropropyl radicals; and n has a value of between one and one hundred thousand;

(iii) a mixture of an organosilicon resinous copolymer which includes in the molecule $R_3SiO_{1/2}$ units, $R_2SiO_{2/2}$ units, $RSiO_{3/2}$ units, and $SiO_{4/2}$ units, in a molar ratio such that the number average molecular weight of the resinous copolymer is between 1,200 to 10,000, in which R represents a radical selected from the group consisting of alkyl radicals of one to six carbon atoms; aryl radicals; alkenyl radicals; trifluoropropyl radicals; and mixtures thereof; and an absorbing filler selected from the group consisting of silica, calcium carbonate, talc, mica, and clay;

(iv) a mixture of an organosilicon resinous copolymer which includes in the molecule $R_3SiO_{1/2}$ units, $R_2SiO_{2/2}$ units, $RSiO_{3/2}$ units, and $SiO_{4/2}$ units, in a molar ratio such that the number average molecular weight of the resinous copolymer is between 1,200 to 10,000, in which R represents a radical selected from the group consisting of alkyl radicals of one to six carbon atoms; aryl radicals; alkenyl radicals; trifluoropropyl radicals; and mixtures thereof; a siloxane polymer of the formula $R_3SiO(R_2SiO)_nSiR_3$ in which R represents a radical selected from the group consisting of alkyl radicals of one to six carbon atoms; aryl radicals; alkenyl radicals; and trifluoropropyl radicals; and n has a value of between one and one hundred thousand; and an absorbing filler selected from the group consisting of silica, calcium carbonate, talc, mica, and clay.

2. A method according to claim 1 in which the organosilicon resinous composition is selected from the group consisting of:

(i) a mixture of a dimethylvinylsiloxy endblocked polydimethylsiloxane, and a benzene soluble resin copolymer of triorganosiloxy units and $SiO_{4/2}$ units which are in the mole ratio of about 0.7 moles of triorganosiloxy units per mole of $SiO_{4/2}$ units;

(ii) a benzene soluble resin copolymer of triorganosiloxy units and $SiO_{4/2}$ units which are in the mole ratio of about 0.7 moles of triorganosiloxy units per mole of $SiO_{4/2}$ units, and which resin includes vinyl radicals in the molecule;

(iii) a resinous copolymeric siloxane composition which is prepared by (i) forming an acidic homogenous mixture of a silanol containing resinous copolymeric siloxane with $R_3SiO_{1/2}$ siloxane units and $SiO_{4/2}$ units; an organohydrogenpolysiloxane having the formula $R_mH_nSiO_{(4-m-n)/2}$ in which m and n are positive integers having a sum less than four; and an organic solvent, and (ii) heating the mixture to remove substantially all of the organic solvent; in which R is selected from the group consisting of alkyl radicals, alkenyl radicals; aryl radicals; arylalkyl radicals; and cycloaliphatic radicals; and (iv) a siloxane resin copolymer including $R_3SiO_{1/2}$ units and $SiO_{4/2}$ units in a mole ratio such that the number average molecular weight is between 1,200 to 10,000; in which R is selected from the group consisting of alkyl radicals of one to six carbon atoms, and aryl radicals.

3. A method according to claim 2 in which the thermoplastic resin is selected from the group consisting of cellulosics, polyolefins, polysulphones, polyimides, polyvinyl alcohols, polyesters, polycarbonates, ABS resins, vinyls, nylons, fluorocarbons, and homopolymers, copolymers, and blended mixtures thereof.

4. A method according to claim 3 in which the thermoplastic resin is a polyethylene selected from the group consisting of low density polyethylene, high density polyethylene, high pressure-low density polyethylene, low pressure-low density polyethylene, and linear low density polyethylene.

* * * * *